(12) United States Patent
Metselaar

(10) Patent No.: US 10,852,755 B2
(45) Date of Patent: Dec. 1, 2020

(54) HVAC SIGNALING OVER A TWO-WIRE CONNECTION

(71) Applicant: ECOBEE INC., Toronto (CA)

(72) Inventor: John Theodore Metselaar, Port Rowan, CA (US)

(73) Assignee: ECOBEE INC., Toronto (CA)

( * ) Notice: Subject to any disclaimer, the term of this patent is extended or adjusted under 35 U.S.C. 154(b) by 94 days.

(21) Appl. No.: 16/111,384

(22) Filed: Aug. 24, 2018

(65) Prior Publication Data

US 2019/0064857 A1     Feb. 28, 2019

Related U.S. Application Data

(60) Provisional application No. 62/549,997, filed on Aug. 25, 2017.

(51) Int. Cl.
    *G05D 23/19*     (2006.01)
(52) U.S. Cl.
    CPC ......... *G05D 23/1919* (2013.01); *G05D 23/19* (2013.01)

(58) Field of Classification Search
    None
    See application file for complete search history.

(56) References Cited

U.S. PATENT DOCUMENTS

| | | | | |
|---|---|---|---|---|
| 4,102,389 | A * | 7/1978 | Wills | F25B 13/00 165/231 |
| 5,627,417 | A * | 5/1997 | Clarke | F04B 49/02 307/141 |
| 5,903,139 | A * | 5/1999 | Kompelien | H02M 5/293 307/39 |
| 10,260,777 | B2 * | 4/2019 | Ward | F24H 1/186 |
| 2013/0257298 | A1 * | 10/2013 | Cheon | H05B 47/10 315/185 R |
| 2014/0368036 | A1 * | 12/2014 | Houde | H02M 1/08 307/31 |
| 2016/0261190 | A1 * | 9/2016 | Shenoy | H02M 3/158 |

* cited by examiner

*Primary Examiner* — Henry T Crenshaw
(74) *Attorney, Agent, or Firm* — Perry + Currier Inc.

(57) ABSTRACT

A method and system for providing HVAC signaling over a two-wire circuit is disclosed which also provides operating power for a thermostat. The system is relatively inexpensive to implement and produces only low levels of heat at the sender unit to avoid adversely affecting the ability of the thermostat to monitor the temperature of its surroundings.

9 Claims, 3 Drawing Sheets

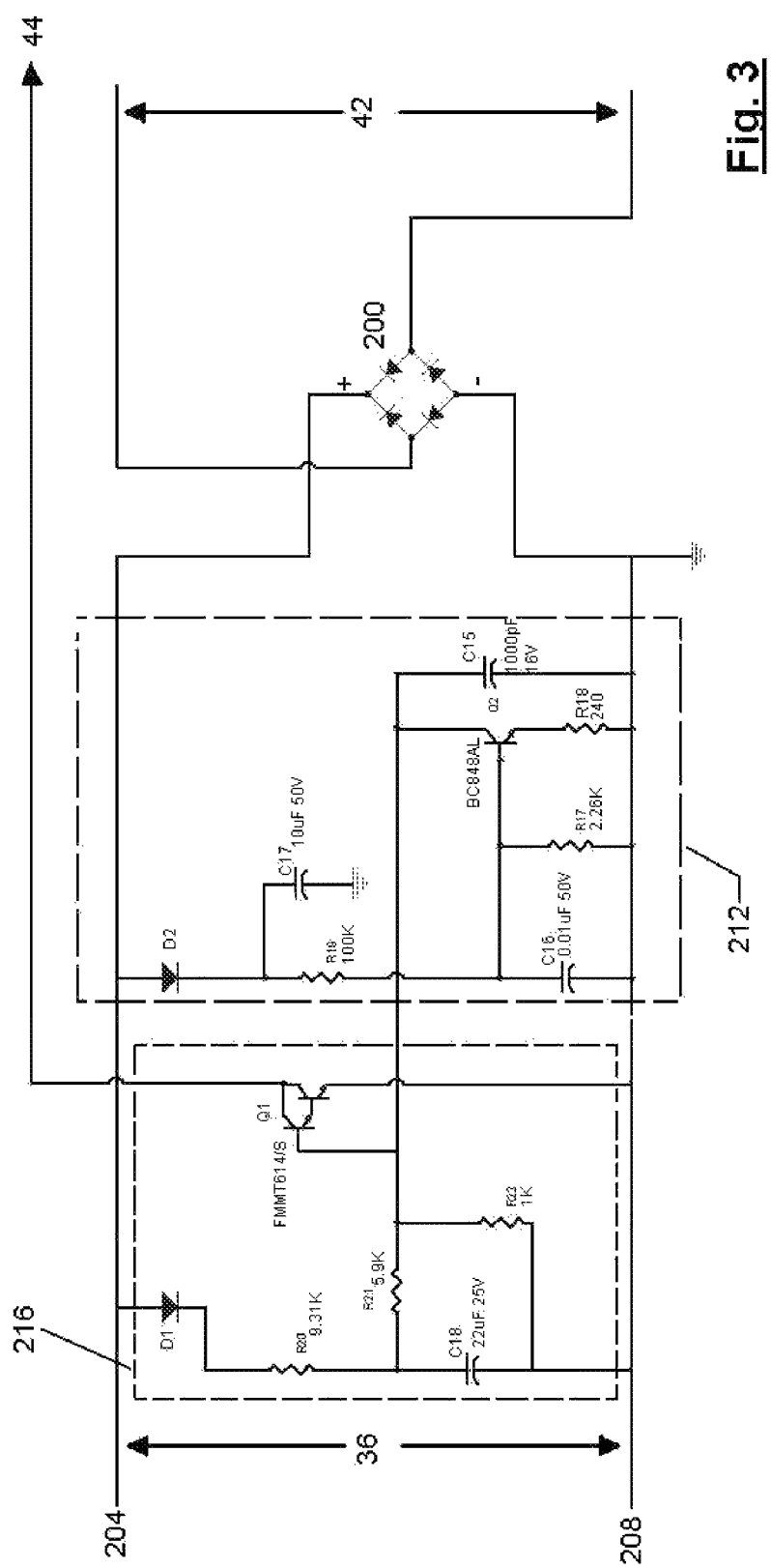

HVAC SIGNALING OVER A TWO-WIRE CONNECTION

CROSS-REFERENCE TO RELATED APPLICATIONS

This application claims priority to U.S. Provisional Application 62/549,997 filed Aug. 25, 2017, the entirety of which is incorporated herein by reference.

FIELD OF THE INVENTION

The present invention relates to HVAC control systems. More specifically, the present invention relates to a system and method for HVAC signaling over two-wire connections.

BACKGROUND OF THE INVENTION

Many legacy, and some current, HVAC systems employ simple control systems wherein a two-wire circuit (typically a 28 VAC circuit or the like) extends from the HVAC equipment to a remote thermostat. In such systems, the thermostat has a switch which operates to open the circuit when the HVAC equipment does not need to be operated and to close the circuit when the HVAC equipment needs to be operated. The thermostats used with such systems are usually primitive systems, typically employing bimetallic tilt switches or the like as their sensing and control mechanisms and such thermostats do not require a dedicated power supply to operate.

If it is desired to retrofit or upgrade such systems to employ a more advanced thermostat, such as one that allows for programmable time-based temperature control or other advanced functionality, problems exist in that the thermostat requires a power supply to operate and thus must be connected to a suitable power supply in addition to being able to open or close the two-wire circuit to the HVAC equipment.

In some circumstances/designs, the advanced thermostat can be "parasitically" powered by connecting it across the two wire circuit and drawing power from it. The thermostat will have power available when the switch in the two-wire system is open and an energy storage device (such as a rechargeable battery) can be included to maintain operating power for the thermostat when the switch is closed. However, several problems exist with such a system, one of the more problematic being that different HVAC equipment will have different sensitivities to the amount of the parasitic current flow through the thermostat. Thus "false activations" can result when the parasitic current flows exceeds some value and the HVAC system sees the circuit as being closed and activates the HVAC equipment. This problem is further exacerbated by the fact that the value at which the HVAC system will falsely believe the circuit to be closed will vary between HVAC systems and therefore a thermostat which will work in one installation, may not work properly in another.

Thus, in many cases where it is desired to upgrade or retrofit an advanced thermostat to an HVAC installation with a two-wire control system, it is either required to pull new cable (with additional conductors) between the HVAC equipment and the thermostat or to provide a separate power supply (typically an AC "power block" adapter) to the thermostat via external wiring. As will be apparent, neither of these options is desirable: pulling cable is expensive and difficult; and providing external power requires a visible cable to run between the power outlet/power block and the thermostat—both of which are unacceptable to many users.

Prior attempts to address these issues include systems such as the "Fast Stat" wiring extenders, sold by Nordic Technology Ltd, Kelowna BC, Canada. These wiring extender systems comprise a receiver unit, located at the HVAC equipment, and a transmitter unit located with the thermostat and they isolate the two wire circuit from the HVAC control input, allowing the two wires to be used to carry AC power to an advanced thermostat without the risk of false activations. When the thermostat needs to activate the HVAC equipment, the transmitter unit receives the activation signal from the thermostat and operates to apply an electrical load to the AC power circuit during the negative half of the AC waveform, thus drawing more current in that part of the AC waveform. The receiver unit detects this change to the AC waveform and interprets that change as a signal and then provides the HVAC control signal to activate the HVAC equipment.

While such wiring extenders do address the need to make power and signaling available over a legacy two wire circuit, they do suffer from disadvantages. Specifically, when the transmitter applies the electrical load to the negative half of the AC power waveform, the current flow through the electrical load creates a significant amount of heat. In many circumstances, this created heat affects the ability of the thermostat to properly detect the temperature of its surroundings and thus to properly control the HVAC equipment. Further, the transmitter unit is somewhat bulky and yet must be located adjacent the thermostat (typically in an aperture in the wall to which the thermostat is mounted) and the required mounting space may not be conveniently available. Further still, the extender system is expensive and can represent a significant portion of the cost to upgrade to an advanced thermostat.

It is desired to have a system and method for providing power and HVAC signaling over a two wire connection which addresses these issues.

SUMMARY OF THE INVENTION

It is an object of the present invention to provide a novel system and method for providing power and HVAC signaling over a two wire connection which obviates or mitigates at least one disadvantage of the prior art.

According to a first aspect of the present invention, there is provided system for providing power and HVAC signaling over a two wire connection extending between a thermostat and HVAC equipment, the thermostat being powered by the provided power, comprising: a sender associated with the thermostat and electrically connected across the two wire connection, the sender responsive to a signal from the thermostat to alter a ripple voltage of the power supplied through the two wire connection; a detector associated with the HVAC equipment and operable to send a signal to activate the HVAC equipment if the ripple voltage has been altered by the sender.

Preferably, the detector includes a discriminator and a dynamic ranging circuit operable to normalize the ripple voltage across the two wire circuit independent of variations in the voltage of the supplied power.

BRIEF DESCRIPTION OF THE DRAWINGS

Preferred embodiments of the present invention will now be described, by way of example only, with reference to the attached Figures, wherein:

FIG. 3 shows a detector for use with the HVAC system of FIG. 1.

DETAILED DESCRIPTION OF THE INVENTION

Figure 1:
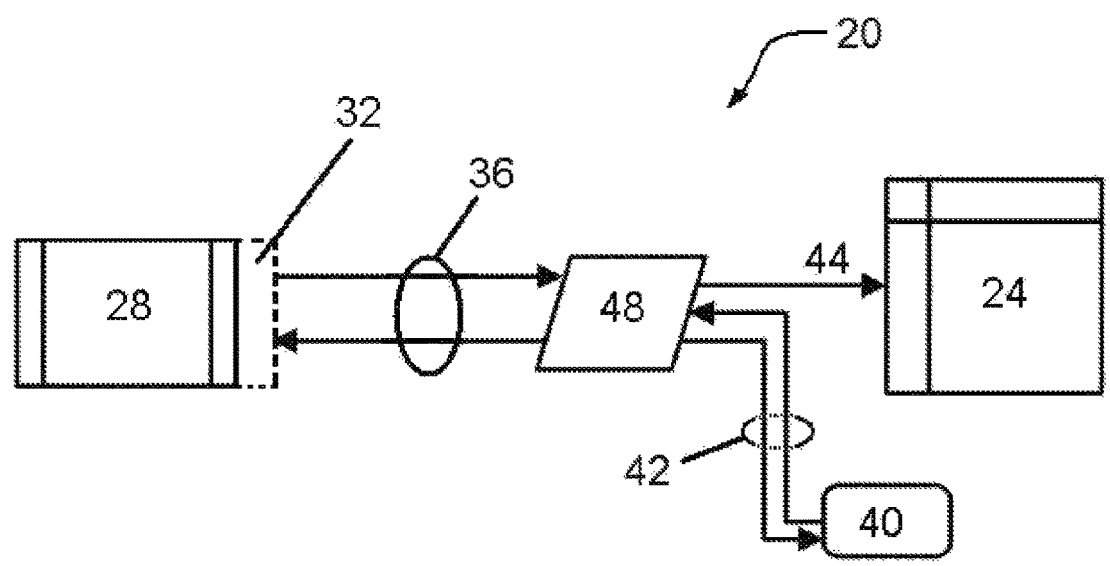
FIG. 1 is a block diagram of an HVAC system employing an embodiment of the present invention.

FIG. 1 shows an HVAC system, indicated generally at 20. System 20 comprises an HVAC equipment installation 24, such as a furnace or boiler, and a thermostat 28. In this example, thermostat 28 requires a power supply to operate. Thermostat 28 is further equipped with a sender unit 32, described in more detail below, which connects thermostat 28 to a two-wire circuit 36.

In the illustrated example, sender unit 32 is shown as being located adjacent to thermostat 28 but sender unit 32 can be included within the enclosure of thermostat 28 if desired.

Also included in system 20 is an AC power supply 40 which is operable to produce the AC power 42 to operate thermostat 28, and to provide an operating signal 44 to HVAC equipment 24. Power unit 40 provides an AC voltage, typically between 24 VAC and 28 VAC for compatibility with legacy HVAC equipment, although the specific voltage is not particularly limited and can be selected to meet the requirements of HVAC equipment 24 and thermostat 28.

System 20 further includes a detector 48 which is typically located adjacent to HVAC equipment 24. Detector 48 cooperates with sender unit 32 and power supply 40 to power thermostat 28 and to control HVAC equipment 24 as described below.

Detector 48 includes a full wave rectifier which operates on the AC power from power supply 40 to produce a DC power output. Detector 48 provides the DC power output from the full wave rectification to thermostat 28 over two-wire circuit 36. As is known to those of skill in the art, the output DC power resulting from full wave rectification will include a measurable voltage ripple. As described below, sender 32 operates to vary the magnitude of this voltage ripple as a means of providing a signal to detector 48 to activate, or deactivate, HVAC equipment 24.

Thermostat 28 is powered by the DC power output from two-wire circuit 36 and sender 32 is also connected across two-wire circuit 36. One possible circuit implementation of sender 32 is shown in FIG. 2.

Figure 2:
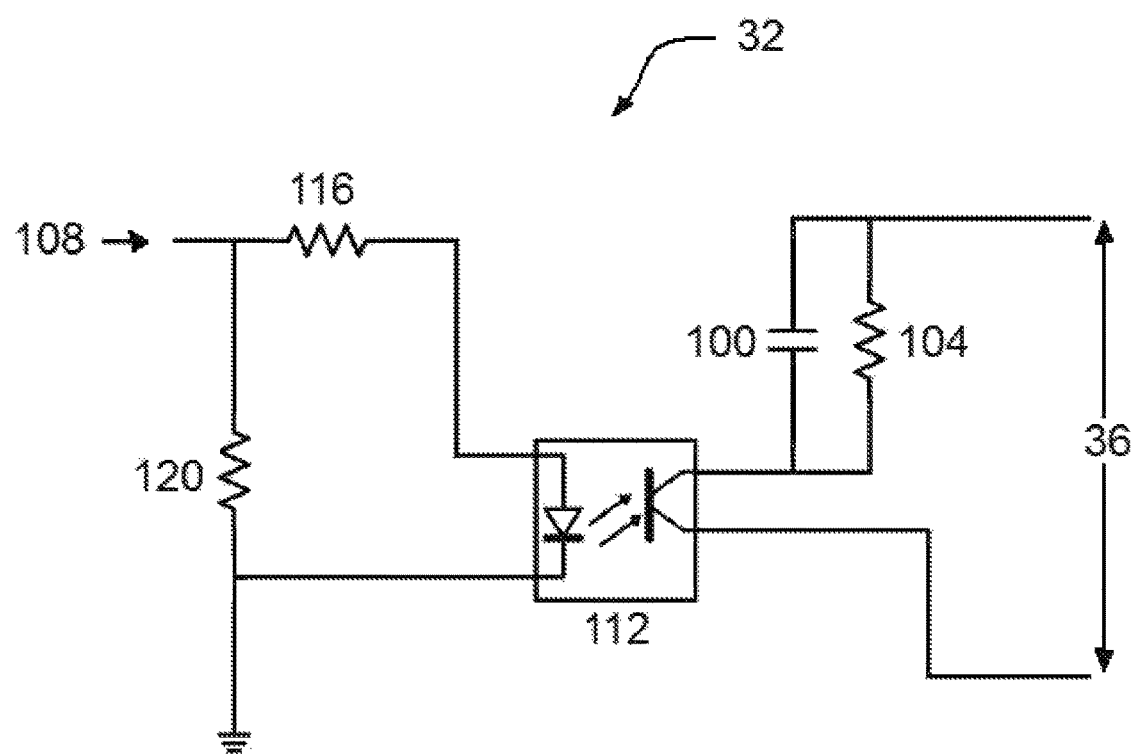
FIG. 2 shows a sender circuit for use with the HVAC system of FIG. 1.

The circuit of FIG. 2 includes a filter capacitor 100 which is appropriately sized, for example a 47 µF/50V capacitor, to significantly reduce the magnitude of the voltage ripple in DC power output when capacitor 100 is electrically connected across two-wire circuit 36. A resistor 104, such as a 470 KΩ resistor, is provided to remove charge from capacitor 100 when capacitor 100 is not electrically connected across two-wire circuit 36, as described below.

Thermostat 28 provides a control output 108, represented by a positive DC voltage, to sender 32 to indicate whether HVAC equipment 24 is to be activated or not. Signal 108 is applied to sender 32, as shown in FIG. 2, to alter the state of a switch 112 to electrically connect capacitor 100 across two-wire circuit 36 when signal 108 is present and to disconnect capacitor 100 from two-wire circuit 36 when signal 108 is not present. In a presently preferred embodiment, switch 112 is an opto-isolator, such as a CPC1014NTR, manufactured by IXYS Integrated Circuits Division, but sender 32 is not limited to the use of an opt-isolator and any other suitable mechanism for switching capacitor 100 between "in-circuit" and "out-of-circuit" states can be employed as will be apparent to those of skill in the art.

Resistors 116 and 120 are employed, if needed, to form a voltage divider to convert signal 108 to the appropriate input voltage and current for switch 112.

As can be seen, when thermostat 28 provides signal 108 (to activate HVAC equipment 24) to sender 32, switch 112 closes to connect capacitor 100 across two-wire circuit 36 and capacitor 100 operates to reduce (i.e.—filter) the ripple voltage of the DC power on two-wire circuit 36. When thermostat 28 removes signal 108 (to deactivate HVAC equipment 24), switch 112 opens to disconnect capacitor 100 from two-wire circuit 36, capacitor 100 discharges itself through resistor 104 and the DC power on two-wire circuit 36 will revert to its unfiltered ripple voltage.

Detector 48 detects, and responds to, the level of the ripple voltage on two-wire circuit 36 to determine if signal 108 has been asserted (i.e.—the ripple voltage is small, thermostat 28 is signaling to activate HVAC equipment 24 be asserting signal 44) or if signal 108 is not asserted (i.e.—the ripple voltage is large, thermostat 28 is signaling to deactivate HVAC equipment 24 by not asserting signal 44).

FIG. 3 shows detector 48 in more detail and, while values are shown in the Figure for the various electrical components, it will be understood by those of skill in the art that the present invention is not limited to components with these specific values, nor to these particular circuit designs. Instead, the circuits and components of FIG. 3 are merely an example of one way in which the present invention can be implemented and a variety of suitable alternative circuits and/or designs will occur to those of skill in the art.

In the example of FIG. 3, AC power 42, from power supply 40, is applied to a full wave rectifier 200 to produce a DC power output which is connected, respectively, to the positive 204 and to the negative 208 side of two-wire circuit 36.

Detector 48 includes a dynamic ranging circuit 212 and a discriminator 216, each of which is described in more detail below. Discriminator 216 operates to produce output signal 44 when the absolute magnitude of the ripple voltage across leads 204 and 208 is below a preset threshold (i.e.— capacitor 100 in sender 32 is "in circuit"). However, as HVAC equipment can be operated at a variety of AC voltages (typically ranging from 18 VACrms to 30 VACrms) the absolute magnitude of the ripple voltage will differ, corresponding to the AC operating voltage and hence dynamic ranging circuit 212 is employed to prevent errors at discriminator 216 due to supply voltage differences.

Specifically, as shown in FIG. 3, dynamic ranging circuit 212 comprises a diode D2 which powers circuit 212. Capacitor C17 holds the peak voltage of the full wave rectified DC voltage across 204 and 208. Depending upon the AC voltage 42, the peak voltage held by capacitor C17 will vary accordingly. For example, if voltage 42 is 18 VACrms then capacitor C17 will be at 25.5V (minus the voltage drop across D2) and if voltage 42 is 30 VACrms, capacitor C17 will be at 42.3V (minus the voltage drop across D2).

Resistors R19 and R17 form a voltage divider to the base of transistor Q2 and capacitor C16 stabilizes this voltage. As the nominal operating voltage across 204 and 208 increases, the voltage at the base of Q1, which is a Darlington transistor, is attenuated through resistor R18.

Discriminator 216 comprises diode D1, resistors R20, R21 and R22 and capacitor C18 which operate to provide a filtered voltage bias to Q1. Q1 requires approximately 1.4V to turn on and thus, when unfiltered full wave rectified voltage is across 204 and 208, the voltage on C18 will be less than 1.4V and Q1 will be off.

Conversely, when capacitor 100 is placed in circuit by sender 32, filtered full wave rectified voltage is across 204 and 208 and the voltage across capacitor C18 rises to at least 1.4V and Q1 is turned on, providing signal 44 to activate HVAC equipment 24.

By attenuating the voltage across resistor R18, and hence to the base of transistor Q2, dynamic ranging circuit 212 operates to prevent changes in AC voltage 42 from changing the turn on point for transistor Q1, thus allowing discriminator 216 to operate correctly independent of variations in AC voltage 42. Thus, dynamic ranging circuit 212 operates to normalize the ripple voltage independent of the supply voltage.

While the examples of FIGS. 2 and 3 teach a system whereby an HVAC control signal can be provided over a two wire connection which provides power to thermostat 28, it is also contemplated that, if desired, the present invention can be expanded to provide more than a single signal over two wire connection 36. For example, sender 32 and thermostat 28 can operate to switch capacitor 100 into and out of circuit across two wire connection 36 to effectively provide binary signaling to detector 48 and for binary "ones" capacitor 100 can be placed in circuit while for binary "zeros" capacitor 100 could be removed from the circuit.

Binary information, for example a start bit, 8 data bits and a stop bit could be transmitted from sender 32 to detector 48 in this fashion and detector 48 would be further equipped with a microcontroller, or the like, which would be responsive to the received binary signal to activate or deactivate, or other alter, the operation of HVAC 24 and any related equipment.

Similarly, it is also contemplated that the present invention can employ quantization level encoding to transmit a larger number of signals over two wire connection 36. Specifically, sender 32 can have two or more capacitors which can be switched into or out of circuit across two wire connection 36 to alter the level of the ripple current thereon, with the various levels of voltage ripple corresponding to control signals from thermostat 28 to detector 48. Detector 48 would again further include a microcontroller or the like to sample the ripple voltage and make appropriate determinations as to the control signals being received.

The present invention provides a novel and useful method and system for providing HVAC signaling over a two-wire circuit which also provides operating power for a thermostat. The system is relatively inexpensive to implement and produces only low levels of heat at the sender unit to avoid adversely affecting the ability of the thermostat to monitor the temperature of its surroundings.

The above-described embodiments of the invention are intended to be examples of the present invention and alterations and modifications may be effected thereto, by those of skill in the art, without departing from the scope of the invention which is defined solely by the claims appended hereto.

I claim:

1. A system for providing power and HVAC signaling over a two wire connection extending between a thermostat and HVAC equipment, the thermostat being powered by the provided power, comprising:
    a sender associated with the thermostat and electrically connected across the two wire connection, the sender responsive to a signal from the thermostat to alter a ripple voltage of the power supplied through the two wire connection;
    a detector associated with the HVAC equipment and operable to send a signal to activate the HVAC equipment if the ripple voltage has been altered by the sender.

2. The system of claim 1 wherein the detector includes a discriminator and a dynamic ranging circuit operable to normalize the ripple voltage across the two wire circuit independent of variations in the voltage of the supplied power.

3. The system of claim 2 wherein the sender is operable in response to the signal from the thermostat to place a capacitor in circuit across the two wire connection to reduce the ripple voltage.

4. The system of claim 3 wherein the signal from the thermostat represents a binary information stream encoding two or more control signals for the HVAC equipment and wherein the sender is operable to place the capacitor in circuit across the two wire connection for each first binary condition and to remove the capacitor from the circuit for each second binary condition and wherein the detector is operable to decode the received binary signal and to output the corresponding control signals.

5. The system of claim 4 wherein the detector further includes a programmable device to decode the received binary signal.

6. The system of claim 5 wherein the programmable device is a microcontroller.

7. The system of claim 3 wherein when two or more signals are received at the sender from the thermostat, the sender is operable in response to the received two or more signals to place at least one of at least two capacitors in circuit across the two wire connection to alter the ripple voltage to a predefined state corresponding to the received two or more signals, and wherein the detector is operable to determine the control signals corresponding to the predefined state of the received ripple voltage, and the detector is further operable to output the determined corresponding two or more control signals.

8. The system of claim 7 wherein the detector further includes a program able device which is operable to determine the predefined state and the at least two control signals corresponding to the determined predefined state.

9. The system of claim 8 wherein the programmable device is a microcontroller.

* * * * *